April 4, 1950 T. W. WINSTEAD 2,502,772
RUFFLED SHEETING AND THE METHOD
OF PRODUCING THE SAME
Filed May 21, 1946 2 Sheets-Sheet 2
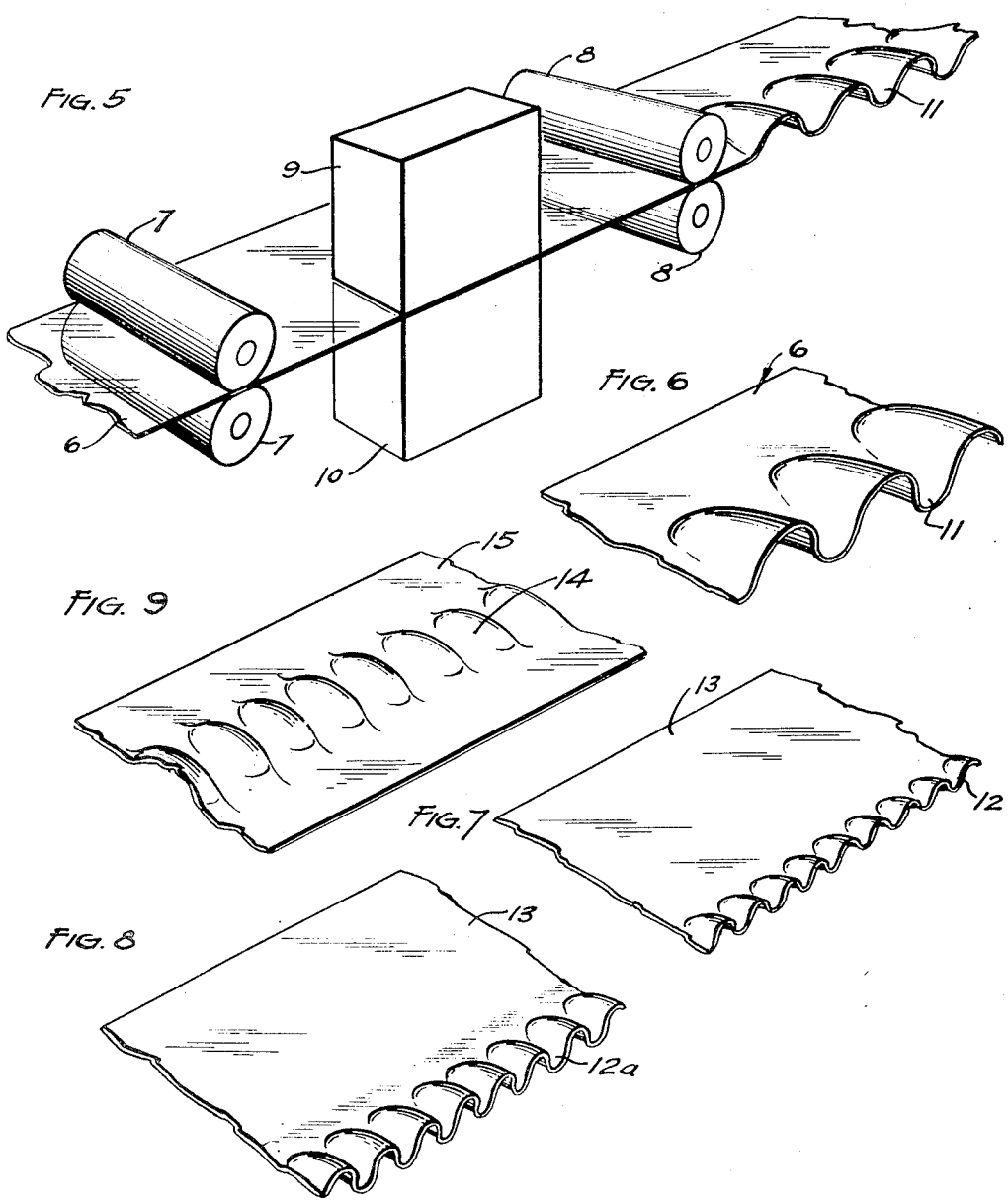
Inventor
THOMAS W. WINSTEAD
By Semmes, Keegin, Beale and Semmes
Attorney Patented Apr. 4, 1950

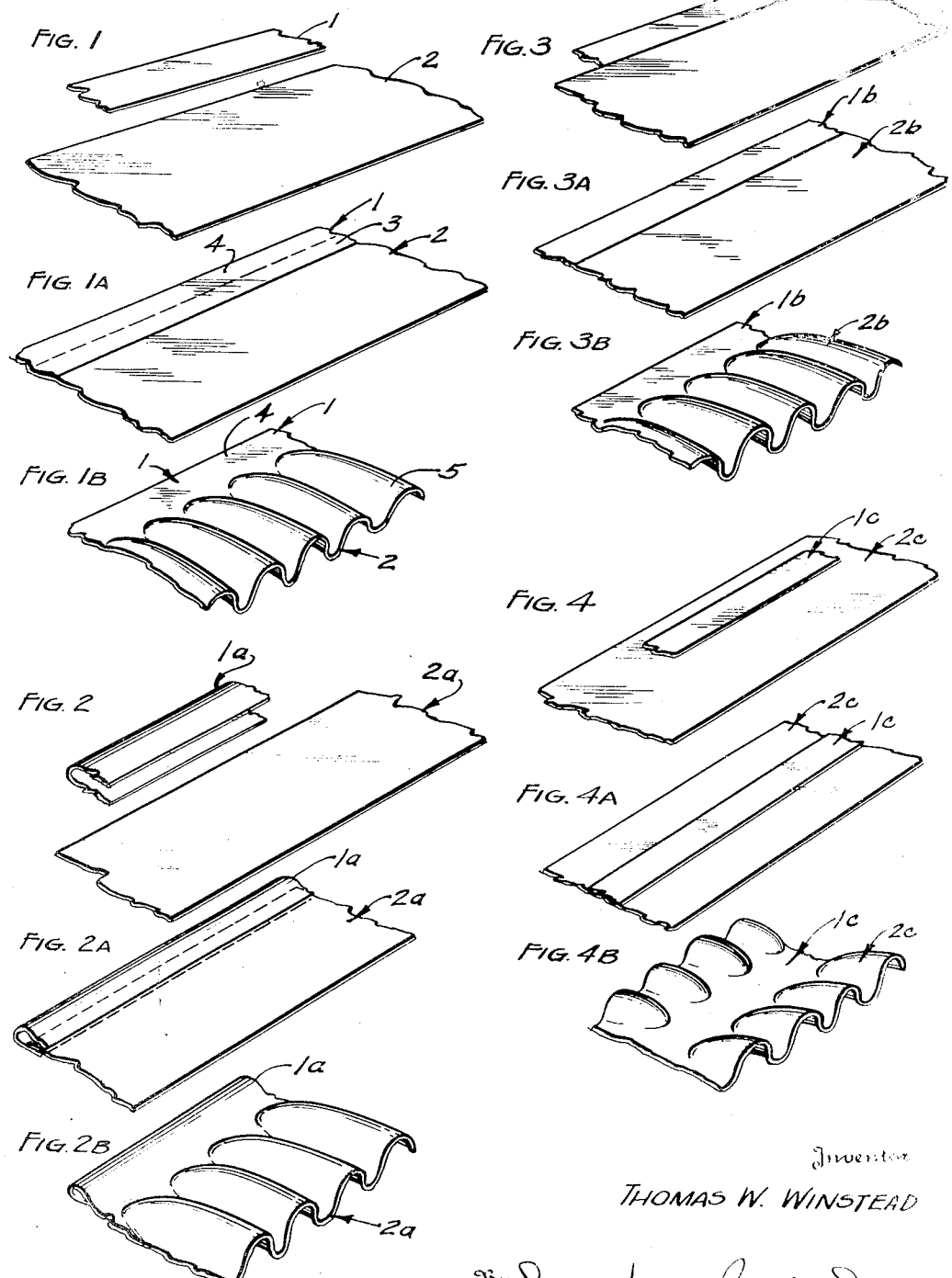

2,502,772

UNITED STATES PATENT OFFICE 2,502,772

RUFFLED SHEETING AND THE METHOD OF PRODUCING THE SAME

Thomas W. Winstead, Baltimore, Md.

Application May 21, 1946, Serial No. 671,369

8 Claims. (Cl. 154—106)

This invention relates to flexible sheet material and more particularly to such material having a gather or ruffle and to methods of producing a gather or ruffle therein.

There are many articles in everyday use, such as wearing apparel, moisture proof covers etc. which are made of relatively non-elastic material but in which an edge (usually at an opening) is resiliently constricted by the combination therewith of an elastic material. Heretofore, this combination has been made either by providing a tubular hem in the edge of the non-elastic material and inserting an elastic strip or band, or by sewing an elastic strip, in a stretched condition to the edge of the non-elastic material so that when the stresses in elastic strip are released it will gather or constrict the non-elastic material.

In other articles such as curtains and drapes, and certain articles of wearing apparel, the appearance is improved by the addition of an edge ruffle or by gathering the material so as to produce a somewhat pleated, draped effect. Here the ruffles have been produced by mechanically gathering a strip of material and stitching it to the main body or, in the case of draping, an edge has been gathered by means of a stitched-on elastic band, as above set forth or by mechanically gathering the edge of the material and stitching the gathered edge to a non-elastic strip.

With the advent of flexible thermoplastic sheeting, many of the above articles have been made of these materials but the methods and means for gathering or ruffling have remained substantially the same as outlined above.

Thermoplastic sheeting is supplied or may be produced in varying degrees of flexibility, the flexibility being directly proportional to the amount of plasticizer incorporated in the material. In some thermoplastics such as polyvinyl chloride or vinyl chloride acetate, increase in the amount of added plasticizer, in addition to importing flexibility to the material, also makes the material more resilient or elastic, closely resembling rubber. Thus, it is possible to produce two pieces of sheeting which have the same visual appearance—thickness, texture, color, etc. —but one being relatively non-elastic and the other having a relatively high degree of elasticity, that is, capable of being stretched and returning to its original condition after the elongating stresses are released.

It is well known that thermoplastic materials may be fused or welded together by means of heat and pressure. I have found, however, that the elastic thermoplastic may be substantially removed if heated and then allowed to cool in a stretched condition, and further, that only the heated portion of the material is thus affected. Thus, for example, if a strip of elastic thermoplastic is stretched longitudinally and heat is applied to a portion only of its width and the strip allowed to cool in the stretched condition, when the elongating forces are released, the non-heated portion will retain its elasticity and return to its original shape and condition while the elasticity will have been removed from the heated portion which will remain elongated and will gather in even ruffles.

I have found further that if a strip of elastic thermoplastic is placed in a stretched condition, either in edge to edge abutting engagement or in a partially overlapping engagement with a sheet of non-elastic thermoplastic and heat and pressure applied to the two so that only a portion of the width of the elastic material is heated, the two materials will become welded together and when cooled the unheated portion of the elastic strip will gather the non-elastic sheet into even folds or ruffles. If the elastic and non-elastic material are of the same thermoplastic, for example vinyl chloride, and the same color, the juncture of the two parts is not discernable and the complete sheet has the appearance of being self gathered and will have, in effect, a self elastic edge. If, on the other hand the elastic and non-elastic materials are of different or contrasting colors, a pleasing decorative effect is produced.

Thermoplastic may be heat sealed to a variety of other materials than to thermoplastic, for example fabric, and the above procedure may be utilized in producing a gathered elastic edge or opening in fabric material. While to produce a gathered elastic effect as above outlined, one of the materials must of necessity be elastic thermoplastic, an elastic thermoplastic may be thus joined to another elastic thermoplastic and such combination may be desirable in certain articles.

As above stated, a number of articles such as bathing caps and dish covers and the like are provided with an elastic opening for insertion of the bodies which they contain and to secure the cover to the body. The above outlined procedure will find wide use in the manufacture of such articles. Not only is the material of the article not weakened by stitching perforations, but the finished article will have a neater and more attractive appearance.

Instead of joining the elastic and non-elastic materials while the elastic material is stretched to produce a gather, the elastic material may first be ruffled by stretching and the application of heat to a portion of its area and then subsequently heat sealed to another sheet with the contracted elastic portion adjacent the second sheet. This procedure would be found useful in applying a ruffled edge to a thermoplastic curtain, for instance, by heating about two and one half inches of the width of a three inch strip of elastic thermoplastic to ruffle the same and then heat sealing the thus ruffled strip to the edge of the curtain with the non-heated and contracted portion of the strip in engagement with the edge or edges of the curtain. The ruffled strip may be of the same color and texture as the main body of the curtain but may be of a different color. In lieu of such an added ruffle, the curtain may be made entirely of a relatively elastic thermoplastic sheet and the edges stretched and heated to produce the ruffle.

One object of the invention, therefore, is to provide a method of producing a gather or ruffle in relatively elastic thermoplastic sheet material by stretching the material, applying heat to a portion thereof desired to be gathered or ruffled and allowing it to cool in the stretched condition to remove the elasticity from the said portion.

Another object of the invention is to provide a method of producing a gather or ruffle in flexible sheet material by heat sealing to the material a strip of relatively thermoplastic material in a stretched condition, heat being applied to only a portion of the width of the elastic material.

A further object of this invention is to provide a method of uniting relatively elastic to relatively non-elastic flexible thermoplastic sheet material to produce a gather or ruffle in the relatively non-elastic material.

A still further object of the invention is to provide an article composed at least in part of a relatively elastic thermoplastic material in which the elasticity has been removed from a portion thereof to produce a gather or ruffle.

Another object of the invention is to provide an article composed of flexible sheet material having a resiliently gathered edge or opening formed by uniting therewith an elastic thermoplastic strip from which the elasticity has been removed in a portion of its width.

With these and other objects and advantages in view, the invention consists in the parts and combinations and the procedural steps hereinafter set forth with the understanding that the described parts and combinations and the order of the procedural steps may be varied without departing from the spirit of the invention.

In order to make the invention more clearly understood, there are shown in the accompanying drawings, diagrammatically, preferred procedural steps for producing gathers or ruffles in flexible sheet material according to this invention, and several ruffled or gathered effects produced by the invention.

In the drawings:

Figure 1 is a fragmentary view in perspective showing the relative arrangement of an elastic strip and non-elastic sheet in a primary procedural step in producing a gather or ruffle in the sheet according to one embodiment of the invention.

Figure 1a is a fragmentary perspective view of the parts shown in Figure 1 but in a second procedural step.

Figure 1b is a fragmentary view in perspective of the parts after uniting and the stretching forces on the elastic strip have been released.

Figure 2 is a view similar to Figure 1 but showing a modified embodiment of the invention wherein the elastic strip is folded longitudinally upon itself.

Figure 2a is a fragmentary view similar to Figure 1a but showing the relative arrangement of the parts illustrated in Figure 2.

Figure 2b is a fragmentary perspective view of the parts shown in Figure 2a after being united and the stretching forces released.

Figure 3 is a fragmentary perspective view showing the relative arrangement of elastic and non-elastic materials in a further modified embodiment of the invention.

Figure 3a is a fragmentary perspective view of a second step in the modified embodiment showing the elastic strip in stretched condition and in abutting relationship to the non-elastic sheet.

Figure 3b is a fragmentary perspective view of the parts shown in Figure 3a after being united and the stretching forces released from the elastic strip.

Figure 4 is a fragmentary perspective view of the relative arrangement of elastic and non-elastic materials in a still further modified form of the invention.

Figure 4a is a fragmentary perspective view of the parts shown in Figure 4 with the elastic strip in stretched condition and superposed on the non-elastic material as in a second procedural step.

Figure 4b is a fragmentary perspective view of the parts shown in Figure 4a after being united and the stretching forces released from the elastic material.

Figure 5 is a diagrammatic view in perspective illustrating a method of continuously ruffling a strip of elastic thermoplastic material.

Figure 6 is a fragmentary perspective view of the strip ruffled in accordance with the method shown in Figure 5.

Figure 7 is a fragmentary perspective view of a curtain with a ruffled strip such as shown in Figure 6 united with the edge thereof.

Figure 8 is a view similar to Figure 7 but indicating the ruffled strip as being of a different color than that of the main body of the curtain.

Figure 9 is a fragmentary perspective view illustrating puckering or gathering in the midsection of a strip of elastic thermoplastic material.

Generally, the invention comprises stretching relatively elastic thermoplastic sheet material, applying heat to a portion of the stretched material and allowing it to cool while in a stretched condition to remove the elasticity from a portion of the sheet so that when the stretching forces are released, the unheated portion, which retains its elasticity and returns to its normal condition, gathers the portion from which the elasticity has been removed, into even ruffles. In one specific embodiment, a strip of elastic thermoplastic is placed, in a stretched condition, in engagement with another elastic or non-elastic flexible sheet, heat and pressure are applied to the materials at their point of engagement to weld them together, only a portion of the width of the elastic strip being heated, however, so that the remaining portion will remain elastic and gather the main sheet in folds or ruffles when the stretching forces are released. In another embodiment, a strip of elastic thermoplastic is ruffled by stretching, heated in a portion of its width while stretched, allowed to cool in this condition and the stretching forces released. This ruffled strip is then united to the edge of a main flexible but non-elastic sheet by heat with the elastic edge of the strip engaging the edge of the main sheet. In any of the combinations of materials the materials may be the same, i. e., thermoplastic sheeting with the same or different degrees of elasticity or the main sheet may be a non-elastic material other than thermoplastic, for example, a suitable fabric. The united materials may be the same or different colors. If the united materials are both thermoplastic of the same weight, texture and color, the juncture is practically invisible.

Referring now to the specific embodiments shown in the drawings, there is shown diagrammatically in Fig. 1 a strip 1 of thermoplastic such as polyvinyl chloride or vinyl chloride acetate with sufficient plasticizer incorporated therewith to give a relatively high degree of elasticity thereto. This strip is stretched lengthwise and superposed in the stretched condition on the edge of a sheet of relatively non-elastic material 2, as shown in Fig. 1A, partially overlapping the edge. The sheet 2 may be the same as the strip or a different flexible material. Heat and pressure are then applied only to the overlapping portions of the strip and sheet, such as in the area 3, which not only fuses the two together but also removes the elasticity from the heated portion of the strip 1. Then when cooled the stretching forces are released and the unheated portion 4 of the strip 1 contracts to its normal condition and gathers with it the contiguous area of the sheet 2 in even folds or ruffles as indicated at 5 in Fig. 1B.

If desired, an elastic strip 1a may be doubled or folded on itself longitudinally as shown in Fig. 2, stretched with the edge of a non-elastic sheet 2a inserted between the plies of the folded strip as shown in Fig. 2A. Heat and pressure are then applied as described above and the result will be a tubular elastic edge which gathers the sheet 2a in ruffles as shown in Fig. 2B.

In lieu of overlapping the elastic strip and sheet as in the foregoing, an elastic strip 1b (Fig. 3) may be stretched and brought into edge to edge abutting relationship with the main sheet 2a, as shown in Fig. 3A, and heat applied to the contiguous edge portions of the sheet and strip. The result will appear as in Fig. 3B with a non-discernable line of juncture of the two materials.

Any of the above procedures will provide an elastic, gathered edge to non-elastic flexible material and its application to articles of manufacture, such as bathing caps, dish covers and similar articles requiring an elastic opening or edge, will be readily appreciated.

For some articles it may be desirable to gather the material in other portions than the edges. The same procedure as outlined above may be followed except that the elastic strip 1c is stretched and superposed on the main sheet 2c in the region desired to be gathered as shown in Figs. 4 and 4A. Heat and pressure are then applied to the elastic strip in a portion of its width, such as adjacent the edges or in the center section, and when cooled, the unheated portion will gather the remainder and main sheet as shown in Fig. 4B.

Ruffled thermoplastic strip material will find many uses such as edges for thermoplastic curtains and the like. This ruffled strip may be made in continuous lengths as indicated in Fig. 5. Elastic thermoplastic material in a continuous strip 6 such as from an extrusion die or calender rolls may be stretched between pairs of feed rolls 7 and 8, which may be operated at different peripheral speeds to stretch the web of material between them. Between the rolls 7 and 8 are suitable heating elements, diagrammatically indicated as 9 and 10, which are shaped and positioned to apply heat to only a portion of the width of the strip. The heating elements may be of any desired type such as infra-red lamps or induction heaters regulated to impart sufficient heat to the strip to destroy its elasticity in the heated portion. After passing the rolls 8 the tension on the strip is released to allow the non-heated portion to contract and gather the heated portion into ruffles (as shown at 11 in Fig. 6) at which time it may be wound onto suitable spools for further use.

One such use is shown in Figs. 7 and 8 as a ruffled edge 12 on the edge of a curtain 13. This ruffled edge is united with the main curtain by overlapping or abutting the unheated, elastic edge of the ruffled strip (unstretched) with the edge of the curtain and heat sealing thereto.

In Fig. 7 the ruffled border 12 is indicated as being the same material and color as the main body of the curtain. As stated above, under such conditions, particularly when heat sealed, the juncture of the two materials is barely discernable and the curtain has the visual appearance of having a self-ruffled edge. In Fig. 8, the ruffled strip 12a is indicated as being of a different color than that of the main body of the curtain to give a further decorative effect.

Puckering, somewhat on the order of "smocking" may also be produced in relatively elastic thermoplastic sheeting in the manner above set forth and as shown in Fig. 9, the elasticity removing heat being applied to the region 14 of a sheet 15 desired to be puckered or gathered while the material is in stretched condition.

I claim:

1. A method of producing a gather or ruffle in elastic thermoplastic sheet material comprising applying opposed forces to the material to stretch the same, applying heat to a portion only of the material while said material is in stretched condition to remove elasticity therefrom, and allowing the heated portion to cool while still in stretched condition whereby said portion with the elasticity removed therefrom will be gathered into ruffles by the contiguous elastic portion upon release of said stretching forces.

2. A method of producing a gather or ruffle in elastic thermoplastic material comprising applying opposed forces to a strip of said material to stretch the same longitudinally, applying heat to the strip in a portion only of its width while in said stretched condition to remove elasticity from the said portion, and allowing the heated portion to cool while in said stretched condition whereby said portion with the elasticity removed therefrom will be gathered into ruffles by the contiguous elastic portion upon release of said stretching forces.

3. A method of gathering or ruffling flexible sheet material comprising placing a strip of relatively elastic thermoplastic material in a stretched condition and in contiguous juxtaposed relationship to said flexible sheet, applying heat and pressure to a portion only of the width of said strip while said strip is in stretched condition to fuse the same to said sheet and to remove elasticity from said portion, allowing the materials to cool with the strip still in stretched condition whereby when the stretch is released the elastic portion of the strip will gather the portion from which the elasticity is removed and the sheet fused thereto into ruffles.

4. A method of gathering or ruffling flexible sheet material comprising placing a strip of relatively elastic thermoplastic material in a stretched condition and in contiguous juxtaposed relationship to an edge of said sheet, applying heat and pressure to a portion only of the width of said strip while said strip is in stretched condition to fuse the same to said sheet and to remove elasticity from said portion, allowing the materials to cool with the strip still in stretched condition whereby when the stretch is released the elastic portion of the strip will gather the portion from which the elasticity is removed and the sheet fused thereto into ruffles.

5. A method of gathering or ruffling flexible sheet material comprising placing a strip of relatively elastic thermoplastic material in a stretched condition in partial overlapping engagement with an edge of said sheet, applying heat to the portion of said strip only overlapping said sheet while said strip is in stretched condition to fuse the same to said sheet and to remove elasticity from said portion, allowing the materials to cool with the strip still in stretched condition whereby when the stretch is released the elastic portion of the strip will gather the portion from which the elasticity is removed and the sheet fused thereto into ruffles.

6. A method of gathering or ruffling flexible sheet material comprising placing a strip of relatively elastic thermoplastic material in stretched condition and in abutting relationship with an edge of said flexible sheet, applying heat to a portion only of the width of said strip adjacent the edge abutting said sheet while said strip is in stretched condition to fuse the same to said sheet and to remove elasticity from said portion, allowing the materials to cool with the strip still in stretched condition whereby when the stretch is released the elastic portion of the strip will gather the portion from which the elasticity is removed and the sheet fused thereto into ruffles.

7. A method of producing a gather or ruffling in relatively non-elastic, flexible thermoplastic sheet material comprising placing a strip of relatively elastic thermoplastic sheet material in a stretched condition and in contiguous juxtaposed relationship to an edge of said non-elastic sheet, applying heat to a portion only of the width of said elastic strip while said strip is in stretched condition to fuse the same to said non-elastic sheet and to remove elasticity from the said portion of the elastic strip, allowing the materials to cool with the strip still in said stretched condition whereby when the stretch is released the elastic portion of the strip will gather the portion from which the elasticity is removed and the sheet fused thereto into ruffles.

8. A method of producing an edge ruffle on thermoplastic sheet material comprising applying opposed forces to a strip of elastic thermoplastic material longitudinally thereof to stretch the same, heating the elastic strip while in stretched condition in a portion only of its width and allowing the same to cool while still in the stretched condition to remove elasticity therefrom, removing the stretching forces to permit the elastic portion to contract and gather the remaining portion into ruffles, and fusing the ruffled strip to an edge of the sheet material with the elastic portion engaging said edge.

THOMAS W. WINSTEAD.

REFERENCES CITED

The following references are of record in the file of this patent:

UNITED STATES PATENTS

| Number | Name | Date |
| --- | --- | --- |
| 1,544,312 | Gray | June 30, 1925 |
| 2,031,703 | Galligan et al. | Feb. 25, 1936 |
| 2,075,189 | Galligan et al. | Mar. 30, 1937 |
| 2,125,495 | French | Aug. 2, 1938 |
| 2,240,274 | Wade | Apr. 29, 1941 |